May 12, 1970
L. ZUCKERMAN
3,512,157
METER WHICH PRINTS TIME AND FLOW READINGS
Filed May 23, 1968
2 Sheets-Sheet 1
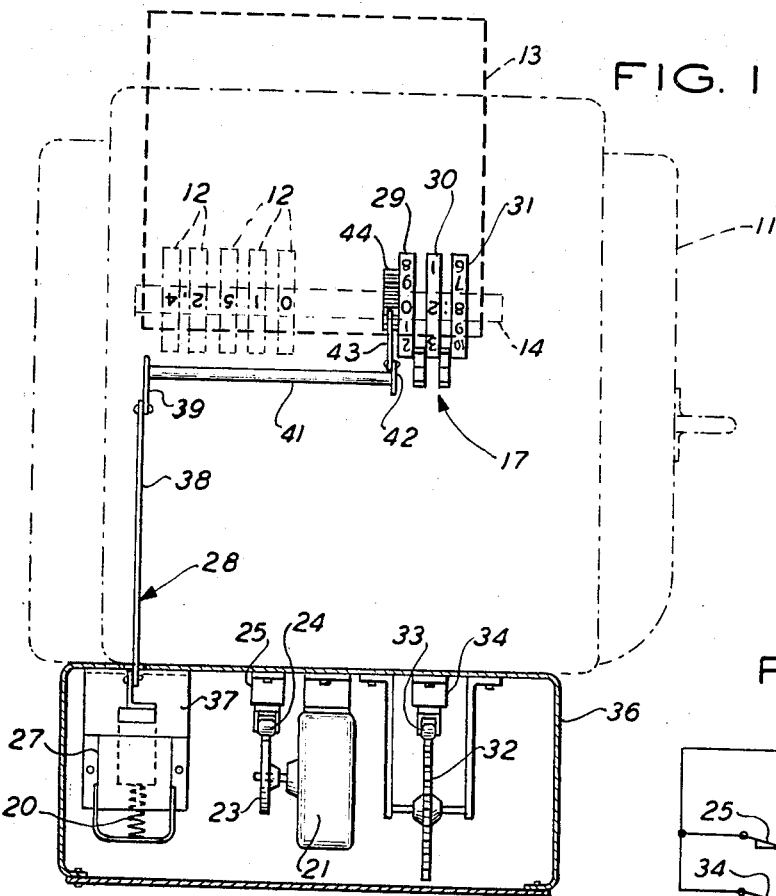
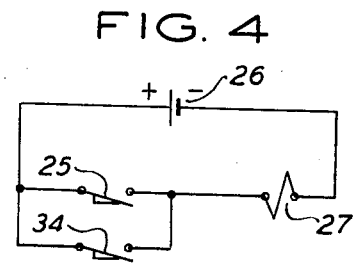
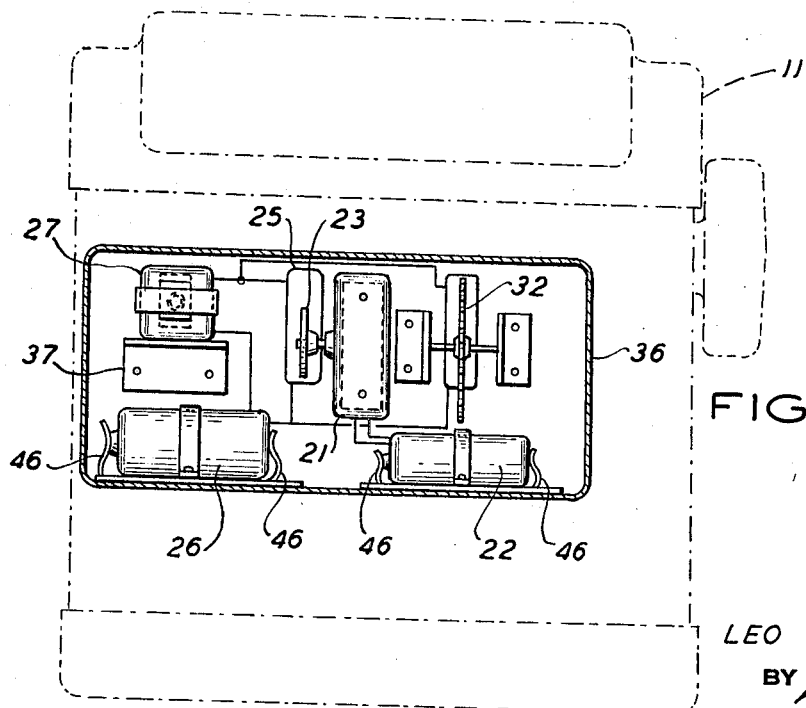
INVENTOR
LEO ZUCKERMAN
BY
*Towson Price*
ATTORNEY May 12, 1970 L. ZUCKERMAN 3,512,157
METER WHICH PRINTS TIME AND FLOW READINGS
Filed May 23, 1968 2 Sheets-Sheet 2
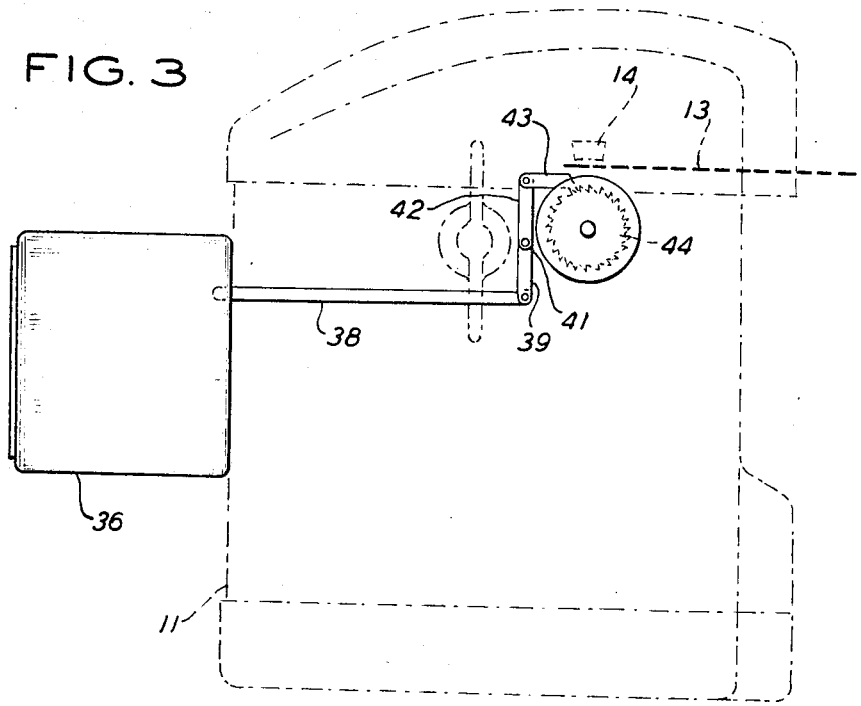
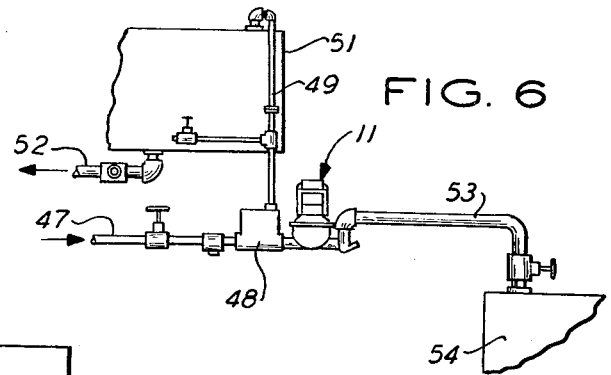
INVENTOR
LEO ZUCKERMAN
BY *Towson Price*
ATTORNEY ated May 12, 1970

United States Patent Office 3,512,157
Patented May 12, 1970

3,512,157
METER WHICH PRINTS TIME AND FLOW READINGS
Leo Zuckerman, Parsippany, N.J.
(180 Knoll Road, Boonton, N.J. 07005)
Filed May 23, 1968, Ser. No. 731,397
Int. Cl. G01d 9/02
U.S. Cl. 346—43
4 Claims

ABSTRACT OF THE DISCLOSURE

A liquid flow meter which has means to print on a ticket the liquid readings at start and completion of a delivery of liquid, to show the amount of liquid delivered, with which is combined a time clock, means to print on the same ticket each time a delivery is started, the time of starting alongside a starting gallon reading, followed by the time of completion of said delivery alongside a completion gallon reading, to enable management to gather information concerning the performance of delivery men, including the busy and slow hours of operation.

---

This invention relates to the improvement of meters, which print tickets showing the liquid measure readings at the beginning and end of a delivery of liquid, by combining therewith mechanism to also print on the tickets opposite the readings, the respective times to show how long it took to effect delivery and at what time of day.

Metering of gasoline and liquefied petroleum products provides a method of cost control which cannot be obtained to so high a degree of permanent accuracy by any other means. Product losses from overmeasure and fraud are prevented and leak-losses of all kinds exposed. Moreover, metering speeds handling, gives an accurate record of every unit of product dispensed from loading rack or truck, and assures customers that the invoiced amount is correct in every respect. It influences personnel to use greater care in product handling and creates good will among those served.

Tank trucks and bulk stations for such products can be operated most efficiently and provide the greatest return when a meter for measuring the liquid is part of the equipment. In each case, the liquid must pass through the meter free of vapor if maximum measuring accuracy is to be achieved.

In accordance with my invention, I propose to combine with such a meter, mechanism which also prints on the ticket showing the gallon readings at start and completion of a delivery, the times at which delivery is started and completed.

Another object is to incorporate mechanism for the above purpose in an existing flow meter.

A further object is to employ an electric clock to turn a cam once each minute to operate a solenoid which, through linkage, controls the setting of the timing wheels which are used to print the times on the delivery ticket.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIG. 1 is a top plan of mechanism embodying my invention, with part of the casing broken away.

FIG. 2 is a rear elevational view of the mechanism of FIG. 1, with part of the casing broken away.

FIG. 3 is a right side elevational view of the mechanism of FIG. 1.

FIG. 4 is a wiring diagram.

FIG. 5 is a plan of a ticket such as printed by the mechanism of the preceding figures.

FIG. 6 shows how a meter embodying my invention may be connected for use in service.

Referring to the drawings in detail, especially FIGS. 1 to 5, inclusive, identifies a liquified petroleum meter suitably housed or enclosed in a housing, and which may be a so-called Neptune Red Seal Type-D Liquid LP- Gas Meter, with model 433 Print-O-Meter Register, as manufactured by Neptune Meter Co., 50 W. 50th St., New York 20, N.Y. Such a meter includes a series of digit-carrying wheels 12 conventionally turnable on a suitable shaft, formed and calibrated to print on a ticket 13 a gallon reading upon the start of a delivery of liquid, followed by a gallon reading at the end of such delivery. The difference between the two readings is the number of gallons or other selected liquid measure which have been delivered.

Suitable conventional means may be provided for inking the wheels 12. At the beginning and end of the operation, a platen 14 conventionally presses the ticket into contact with the series of numerals set up as the wheels are turned by conventional means. The ticket 13 which when unused carries merely the matter illustrated in FIG. 5, without the numbers, but including the words "TIME" and "GALLONS" side by side and under which as two columns are to be printed the time and gallonage readings, is moved a small distance between start and finish, so that a gallons beginning FIG. 15 is followed by a gallons ending FIG. 16 spaced therefrom, as shown in FIG. 5.

In accordance with my invention, I improve on the meter 11 by combining with the mechanism thereof a time readout and printer 17 which will then print on the same ticket 13 the time 18 of starting the delivery adjacent the gallons number 15 and the time 19 of ending the delivery adjacent the gallons number 16. This makes it possible to not only record the number of gallons delivered, but also the time of day the delivery is started, followed by the time the delivery is completed.

Preferred means for accomplishing this result are as follows: A clock controls a motor 21 which is powered by battery 22 and turns a cam 23 one complete revolution per minute. The cam 23 engages a roller 24 at its circumference, which roller is carried by a movable part of a limit switch 25. When this cam has moved the roller to cause the switch contacts to engage, a circuit is completed from the battery 26 through limit switch 25, thus powering solenoid 27 as shown in FIGS. 1, 2 and 4.

Solenoid 27 when activitated, thus moves forward one stroke per minute during the contact of cam 23 which closes the limit switch 25. The forward stroke of solenoid 27, coupled to the linkage 28, advances printing wheel 29 one tenth of a revolution, to represent one minute. Upon deactivation, the solenoid is moved to its normal position by return spring 20.

As printing wheel 29, desirably mounted on the shaft which carries the wheels 12, makes one complete revolution it, as by means of a calibrated tripping pin, rotates printing wheel 30 on the same shaft one sixth of a revolution to represent ten minutes. As printing wheel 30 makes one complete revolution, it as by means of such a pin, advances printing wheel 31 on the same shaft one twelfth of a revolution, to represent one hour. Printing wheel 29 is calibrated in minutes, 1 to 10. Printing wheel 30 is calibrated in sixths of an hour, 0 to 5. Printing wheel 31 is calibrated in hours or twenty-fourths of a day, 1 to 12.

A clock adjustment may be made by manually rotating the accessible cam 32, which contacts a roller 33 at its circumference, which roller is carried by a movable part of a limit switch 34. When this cam has moved the roller to cause the switch contacts to engage, a circuit is completed from the battery 26 through limit switch 34, thus powering solenoid 27 and turning the wheel 29 to the desired extent.

When delivery ticket 13 is inserted by the operator into the ticket slot of the combined apparatus before and after a delivery is made, that is, the ticket is moved by said operator between printings, the delivery in gallons is determined by the liquid flow meter 11 and recorded on printing wheels 12. The time at the moment of each insertion recorded on printing wheels 29, 30 and 31, will also appear under the printing platen 14, made long enough for the purpose, and will be printed simultaneously with the gallons showing when said platen engages the delivery ticket.

The parts combined with the liquid meter 11, to actuate the printing wheels for showing time as well as amount of liquid delivered, are housed in a suitable casing 36 attached to the rear side of the housing for said meter. A bracket 37 secured to the inner front wall of casing 36 may serve to support the solenoid 27. The linkage 28 may comprise a link 38, passing through a suitable aperture in the connected rear wall of the meter 11 and the front wall of the casing 36, the rear end of which is pin-connected to the solenoid 27 and the front end of which is pin-connected to a crank 39 fixed on one end of a shaft 41. The shaft 41 is suitably carried in bearings, not shown, supported by the meter-housing and a crank 42 is fixed thereto at its other end. A pawl 43, pin-connected to the crank 42, may engage a ratchet 44 on the wheel 29, so that each oscillation of the pawl, as the solenoid is energized and released, advances the wheel one tenth of a revolution or one digit representing one minute.

The clock motor 21 is shown powered by a battery 22, although a single battery or other power source may be used for said motor and the solenoid 27. The batteries 26 and 22 are shown carried between spring clips 46, mounted on the bottom wall of the casing 36. The clock and its motor 21, the limit switches 25 and 34, and the cam 32 are carried by the front wall of said casing as illustrated. Parts not described may be conventional or on the meter before improved.

Now referring to FIG. 6, it will be seen that the meter 11, carrying the improvements before described, may be connected to receive liquid through pipe 47 from the delivery end of a pump, not shown. The liquid to the meter first desirably passes through a combination vapor release and strainer 48. The top of the device 48 may also be connected by a pipe 49 to the top of a storage tank 51, having a pipe 52 leading to the receiving end of the same pump. A pipe 53 may connect the outlet end of the meter 11 to a tank 54 to be filled.

To further show the value of the invention, it is to be noted that the beginning time and the finishing time indicate to management that a pumping system is or is not functioning properly. Pumping efficiency is affected by such characteristics as pump wear, inadequate piping size, improper power take off, internal deterioration of hose, length of hose, as well as a constriction in the fitting.

Having now described my invention in detail in accordance with the requirements of the patent statutes, those skilled in this art will have no difficulty in making changes or modifications in the individual parts or their relative assembly in order to meet specific requirements or conditions. Such changes and modifications may be made without departing from the scope and spirit of the invention.

I claim:

1. A liquid delivery meter including a housing, means to lead to said meter the liquid from a supply thereof, means to lead liquid measured by said meter to a tank or the like to be provided with said liquid, mechanism in said meter housing comprising a series of digit-carrying wheels turnable on a shaft, formed and calibrated to print on a ticket the liquid measure reading upon the start of a delivery operation, followed by the printing of a liquid measure reading upon the completion of said operation; the improvement residing in that said ticket has two columns headed "TIME" and 'GALLONS," respectively, said mechanism also includes a second series of digit-carrying wheels turnable in said housing on the same shaft, a platen for engaging and pressing the ticket for printing the liquid measure and which is extended to also engage and press the ticket to print the time on the same ticket simultaneously with the gallonage printing, a casing secured to a wall of the housing, mechanism enclosed therein comprising a cam for controlling the printing operation, a clock, a motor controlled by said clock to turn the cam one revolution per minute, a limit switch closed by said cam, a solenoid energized upon closure of said switch, and linkage between said solenoid and the first wheel of the second series to effect turning thereof, said linkage comprising a link passing through the rear wall of the meter housing and the front wall of the casing, a pin connecting the rear end of said link to said solenoid, a meter-housing-supported-shaft, a crank fixed on one end thereof, a pin connecting the front end of said link to said crank, a crank fixed on the other end of said shaft, a pawl pin-connected to said crank, and a ratchet carried on said first wheel and engaged by said pawl, so that when the solenoid is energized and released, said first wheel is advanced to change the reading to be printed by one minute, whereby the time of starting may be printed under "TIME" on said ticket, alongside the printing of the starting liquid measure under "GALLONS" on said ticket, and the time of completion may be printed on said ticket in the column under "TIME" and the first time reading, after movement thereof by the operator, alongside the printing of the completing liquid measure under "GALLONS" and the first gallons reading on said ticket, so as to furnish information on the performance of the men delivering the liquid.

2. A liquid delivery meter as recited in claim 1, the second series of wheels comprising in addition to said first wheel which is turnable on said shaft and carries printing digits from zero to nine representing minutes, a second wheel adjacent thereto, turnable on said shaft and carrying printing digits from zero to five, associated with the first wheel so that it is rotated one digit representing ten minutes, when the first wheel makes a complete revolution, a third wheel also turnable on said shaft and carrying printing digits from one to twelve, and means associating said third wheel with the second wheel so that it turns one digit, representing one hour, upon the second wheel making a complete revolution.

3. An attachment for the housing of a liquid delivery meter which has means in said housing comprising a series of digit-carrying wheels turnable on a shaft, formed and calibrated to print on a ticket the liquid measure reading upon a start of a delivery operation followed by the printing of the liquid measure reading upon the completion of said operation, the improvement residing in that said ticket has two columns headed "TIME" and "GALLONS," respectively, said mechanism also includes a second series of digit-carrying wheels turnable in said housing on the same shaft, a platen for engaging and pressing the ticket for printing the liquid measure and which is extended to also engage and press the ticket to print the time on the same ticket simultaneously with the gallonage printing, a casing securable to a wall of the housing, mechanism enclosed therein comprising a cam for controlling the printing operation, a clock, a motor controlled by said clock to turn the cam one revolution per minute, a limit switch opened and closed by operation of said cam, a solenoid energized upon closure of said switch, and linkage between said solenoid and the first wheel of the second series to effect turning thereof, said linkage comprising a link to pass through the rear wall of the meter housing and the front wall of the casing, a pin connecting the rear end of said link to said solenoid, a meter-housing-supportable shaft, a crank fixed on one end thereof, a pin connecting the front end of said link to said crank, a crank fixed to the other end of said shaft, a pawl pin-connected to said crank, and a ratchet carried on said first wheel and engaged by said pawl, so that when the solenoid is energized and released, said first wheel is advanced to change the reading to be printed by one minute whereby the time of starting may be printed under time on said ticket, alongside the printing of the starting liquid measure under "GALLONS" on said ticket, and the time of completion may be printed on said ticket in the column under "TIME" and the first time reading, after movement thereof by the operator, alongside the printing of the completing liquid measure under "GALLONS" and the first gallons reading on said ticket, so as to furnish information on the performance of the men delivering the liquid.

4. An attachment for the housing of a liquid delivery meter as recited in claim 3, the second series of wheels comprising in addition to said first wheel which is turnable on said shaft and carries printing digits from zero to nine representing minutes, a second wheel adjacent thereto, turnable on said shaft and carrying printing digits from zero to five, associated with the first wheel so that it is rotated one digit, representing ten minutes, when the first wheel makes a complete revolution, a third wheel also turnable on said shaft and carrying printing digits from one to twelve, and means associating said third wheel with the second wheel so that it turns one digit, representing one hour, upon the second wheel making a complete revolution.

References Cited

UNITED STATES PATENTS

| | | | |
|---|---|---|---|
| 2,254,661 | 9/1941 | Markley et al. | 346—60 X |
| 2,549,556 | 4/1951 | Wuischpard | 235—117 |
| 3,366,967 | 1/1968 | Sherman et al. | 346—43 |

JOSEPH W. HARTARY, Primary Examiner

U.S. Cl. X.R.

346—60; 222—30